(12) United States Patent
Janus et al.

(10) Patent No.: US 9,646,153 B2
(45) Date of Patent: May 9, 2017

(54) SECURING CONTENT FROM MALICIOUS INSTRUCTIONS

(75) Inventors: Scott Janus, Rocklin, CA (US); Brian Scully, Folsom, CA (US); Sanjay S. Nair, Sunnyvale, CA (US); Gaurav Kumar, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 59 days.

(21) Appl. No.: 13/569,937

(22) Filed: Aug. 8, 2012

(65) Prior Publication Data
US 2014/0047470 A1    Feb. 13, 2014

(51) Int. Cl.
| | | |
|---|---|---|
| H04N 21/254 | (2011.01) | |
| G06F 21/51 | (2013.01) | |
| H04L 9/32 | (2006.01) | |
| G06F 21/56 | (2013.01) | |
| G06F 21/12 | (2013.01) | |
| G06F 21/44 | (2013.01) | |
| H04N 21/442 | (2011.01) | |
| H04N 21/4627 | (2011.01) | |
| H04N 21/835 | (2011.01) | |
| H04L 9/06 | (2006.01) | |
| H04L 9/00 | (2006.01) | |

(Continued)

(52) U.S. Cl.
CPC ............ *G06F 21/51* (2013.01); *G06F 21/123* (2013.01); *G06F 21/44* (2013.01); *G06F 21/565* (2013.01); *G06F 21/567* (2013.01); *H04L 9/321* (2013.01); *H04L 9/3239* (2013.01); *H04L 9/3247* (2013.01); *H04N 21/2541* (2013.01); *H04N 21/44236* (2013.01); *H04N 21/4627* (2013.01); *H04N 21/835* (2013.01); *H04L 9/006* (2013.01); *H04L 9/0643* (2013.01); *H04N 21/234327* (2013.01); *H04N 21/41407* (2013.01)

(58) Field of Classification Search
None
See application file for complete search history.

(56) References Cited

U.S. PATENT DOCUMENTS 7,891,012 B1 *    2/2011    Kiel et al. ................... 726/30
8,245,307 B1 *    8/2012    Pharris ................. H04L 9/3234
                                                    713/176

(Continued)

FOREIGN PATENT DOCUMENTS

WO    2014025468 A1    2/2014

OTHER PUBLICATIONS

Shi, W., Lee, H., Yoo, R., Boldyreva, A.; "A Digital Rights Enabled Graphics Processing System"; Graphics Hardware (2006), M. Olano and P. Slusallek (Editors).*

(Continued)

*Primary Examiner* — Kaveh Abrishamkar
*Assistant Examiner* — Christopher Ruprecht
(74) *Attorney, Agent, or Firm* — International IP Law Group, P.L.L.C.

(57) ABSTRACT

A method and system is provided for securing content from malicious shaders. The method includes determining the content the shader is to execute. A signature of the shader is verified in response to the shader attempting to execute on protected content. In response to the shader being verified, it is verified that the shader has not been modified. The shader is executed in response to not being modified.

17 Claims, 6 Drawing Sheets

(51) Int. Cl.
*H04N 21/2343* (2011.01)
*H04N 21/414* (2011.01)

(56) References Cited

U.S. PATENT DOCUMENTS

| | | | |
|---|---|---|---|
| 8,452,981 B1* | 5/2013 | Kiel et al. | 713/189 |
| 2004/0111627 A1* | 6/2004 | Evans et al. | 713/189 |
| 2005/0021539 A1* | 1/2005 | Short et al. | 707/100 |
| 2006/0130144 A1 | 6/2006 | Wernicke | |
| 2008/0063196 A1* | 3/2008 | Evans et al. | 380/200 |
| 2009/0089579 A1* | 4/2009 | Murase et al. | 713/164 |
| 2010/0146292 A1* | 6/2010 | Shi et al. | 713/189 |
| 2010/0146501 A1* | 6/2010 | Wyatt et al. | 718/1 |
| 2010/0186095 A1* | 7/2010 | Ray et al. | 726/27 |
| 2012/0075314 A1* | 3/2012 | Malakapalli et al. | 345/522 |
| 2013/0227521 A1* | 8/2013 | Bourd et al. | 717/110 |
| 2014/0043333 A1* | 2/2014 | Narayanan et al. | 345/426 |

OTHER PUBLICATIONS

Anonymously Disclosed, "Method for authenticating processor execution streams at runtime", IP.com, IPCOM000008847D, Jul. 17, 2002.*

Microsoft, E. Nikitin, J. Kuzminova, "Compile-Time Trust Level Assessment", IP.com, IPCOM000146933D, Feb. 28, 2007.*

Wikipedia, "Code signing", old version, Mar. 21, 2012.*

Anonymously Disclosed, "Executable Integrity Verification", IP.com, IPCOM000205271D, Mar. 23, 2011.*

Koller, D., Frischer, B., and Humphreys, G. 2009. "Research Challenges for Digital Archives of 3D Cultural Heritage Models". ACM Journal on Computing and Cultural Heritage, vol. 2, No. 3, Article 7, Publication date: Dec. 2009.*

International Search Report received for PCT Patent Application No. PCT/US2013/047640, mailed on Oct. 16, 2013, 4 pages.

* cited by examiner

SECURING CONTENT FROM MALICIOUS INSTRUCTIONS

TECHNICAL FIELD

The present invention relates generally to protected audio and video playback. More specifically, the present invention relates to securing protected audio and video from malicious instructions.

BACKGROUND ART

One or more shaders may execute on a processor in order to render protected audio or video. As used herein, a shader is a piece of code that typically executes as part of a graphics subsystem. Shaders may apply various effects to images rendered by the graphics processing unit (GPU) rendering pipeline. Shaders may also be used for malicious purposes, such as sending protected audio and video content to an unauthorized third party. Additionally, malicious shaders may be used to send personal information, such as account passwords and financial information, to unauthorized third parties.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
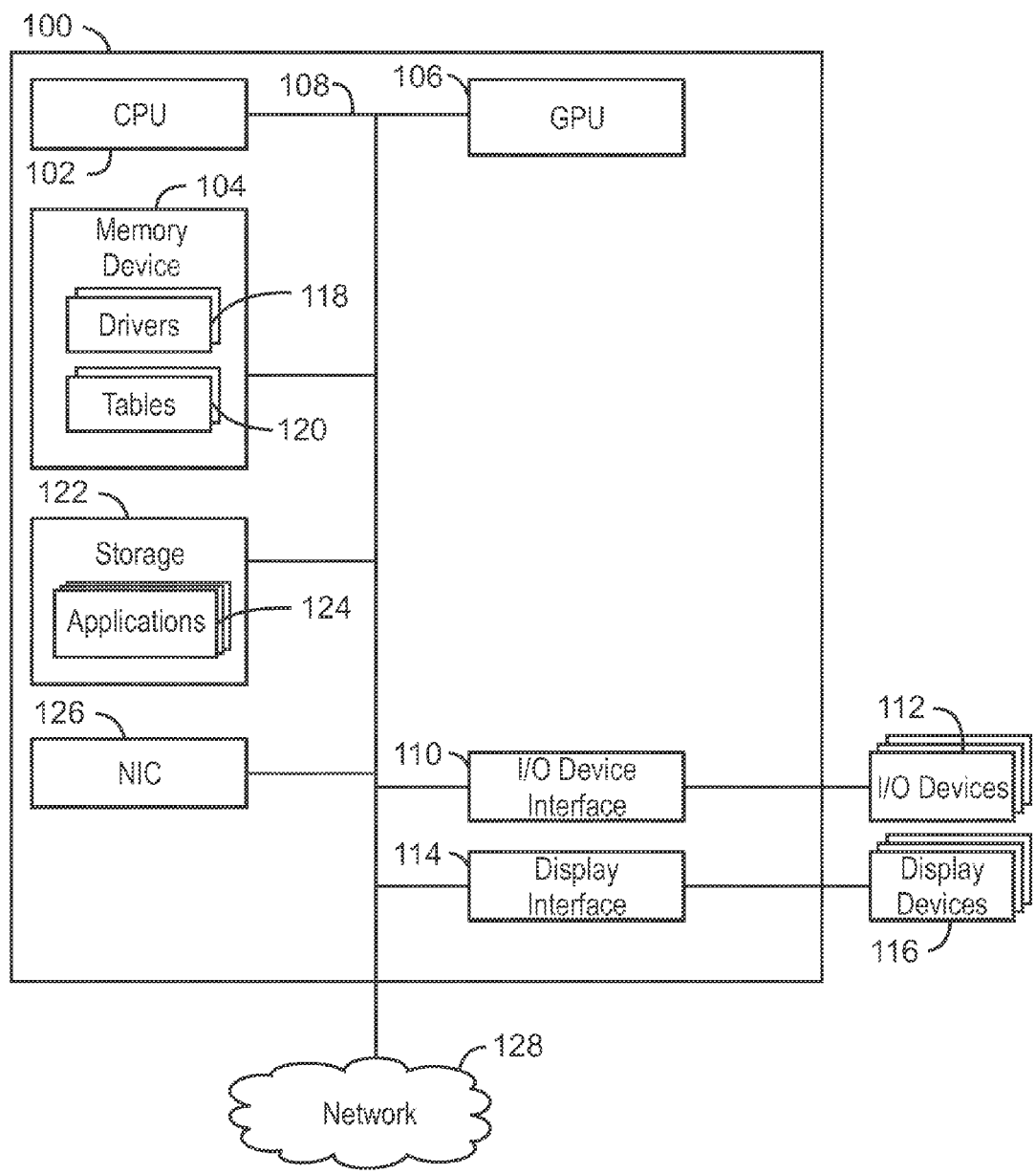
FIG. 1 is a block diagram of a computing device that may be used to secure content from malicious shaders, in accordance with embodiments.

As discussed above, malicious shaders can be used to obtain otherwise protected content. While various mechanisms are used to authenticate code such as operating systems and applications, these mechanisms do not apply to smaller pieces of code like shaders or other algorithms that operate on audio and video content.

In some examples, a protected audio video path can be used to protect premium content, such as high-definition video. Premium content may include Blu-Ray disc playback. A protected audio video path may encrypt the Blu-Ray data sent by a Blu-Ray player to a GPU through hardware connections. Such hardware connections may be used to prevent the Blu-Ray data from being copied as it passes through the various hardware components. The hardware components used to form the protected audio video path may include a fixed function hardware unit. Like shaders, the fixed function hardware unit may be used to apply effects to images rendered by the GPU rendering pipeline. Accordingly, in embodiments, shaders may serve as a software alternative to a fixed function hardware unit. In any event, both shaders and fixed function hardware units can access the cleartext or ciphertext versions of the premium content. The cleartext version of the premium content is the unencrypted version of the premium content, while the ciphertext version is the encrypted content. In this manner, malicious shaders may steal premium content from the GPU rendering pipeline as malicious shaders are not authenticated. Accordingly, embodiments described herein secure content from malicious shaders. As described herein, an unauthenticated shader may be prevented from accessing protected content.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may be used to secure content from malicious shaders, in accordance with embodiments. The computing device 100 may be, for example, a laptop computer, desktop computer, tablet computer, mobile device, server, or cellular phone, among others. The computing device 100 may include a central processing unit (CPU) 102 that is configured to execute stored instructions, as well as a memory device 104 that stores instructions that are executable by the CPU 102. The CPU 102 can be a single core processor, a multi-core processor, a computing cluster, or any number of other configurations. Furthermore, the computing device 100 may include more than one CPU 102. The memory device 104 can include random access memory (RAM), read only memory (ROM), flash memory, or any other suitable memory systems. For example, the memory device 104 may include dynamic random access memory (DRAM).

The computing device 100 may also include a graphics processing unit (GPU) 106. As shown, the CPU 102 may be connected through a bus 108 to the GPU 106. The GPU 106 may be configured to perform any number of graphics operations within the computing device 100. The instructions that are executed by the GPU 106 may be used to secure content from malicious shaders. For example, the GPU 106 may be configured to render or manipulate graphics images, graphics frames, videos, or the like, to be displayed to a user of the computing device 100.

The CPU 102 may be connected through the bus 108 to other input/output (I/O) components using an I/O device interface 110 configured to connect the computing device 100 to one or more I/O devices 112. The I/O devices 112 may include, for example, a keyboard and a pointing device, wherein the pointing device may include a touchpad or a touchscreen, among others. I/O devices 112 may be built-in components of the computing device 100, or may be devices that are externally connected to the computing device 100.

The CPU 102 may also be linked through the bus 108 to a display interface 114 configured to connect the computing device 100 to a display device 116. The display device 116 may include a display screen that is a built-in component of the computing device 100. The display device 116 may also include a computer monitor, television, or projector, among others, that is externally connected to the computing device 100.

The memory device 104 may include one or more drivers 118. The drivers enable a piece of hardware or an application to communicate with the operating system, applications, or other hardware of the computing device 100. The drivers may also be used to secure content from malicious shaders, in accordance with embodiments. The memory device 104 may include tables 120. The tables 120 may include one or more lists, including but not limited to, a list of trusted entities and a list of blocked shaders. In embodiments, the list of trusted entities may be used to authenticate the entities that sign shaders. Further, in embodiments, the signature may be a digital signature. The list of blocked shaders is a list of shaders that are blocked from executing within computing device 100. In embodiments, a new shader is compared to the list of blocked shaders. If the new shader is found on the list of blocked shaders, then the new shader is blocked from executing.

The computing device 100 may also include a storage device 122. The storage device 122 is a physical memory such as a hard drive, an optical drive, a thumbdrive, an array of drives, or any combinations thereof. The storage device 122 may also include remote storage drives. The storage device 122 may also include one or more applications 124. The applications 124 may send protected content to the GPU in order to be rendered by the GPU. For example, the protected content may by on a Blu-Ray disc, and the applications 124 may initiate playback of the Blu-Ray disc. In other examples, an application 124 is a web browser, and the protected content is sensitive data accessed by a user. Sensitive data may include financial information and other personal data. Additionally, when the computing device is a mobile phone, protected content may include the audio content received and transmitted when a user of the phone is on a telephone call. A network interface controller (NIC) 126 may be configured to connect the computing device 100 through the bus 108 to a network 128. The network 128 may be a wide area network (WAN), local area network (LAN), or the Internet, among others. In examples, the protected content may be accessed using the network 128.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
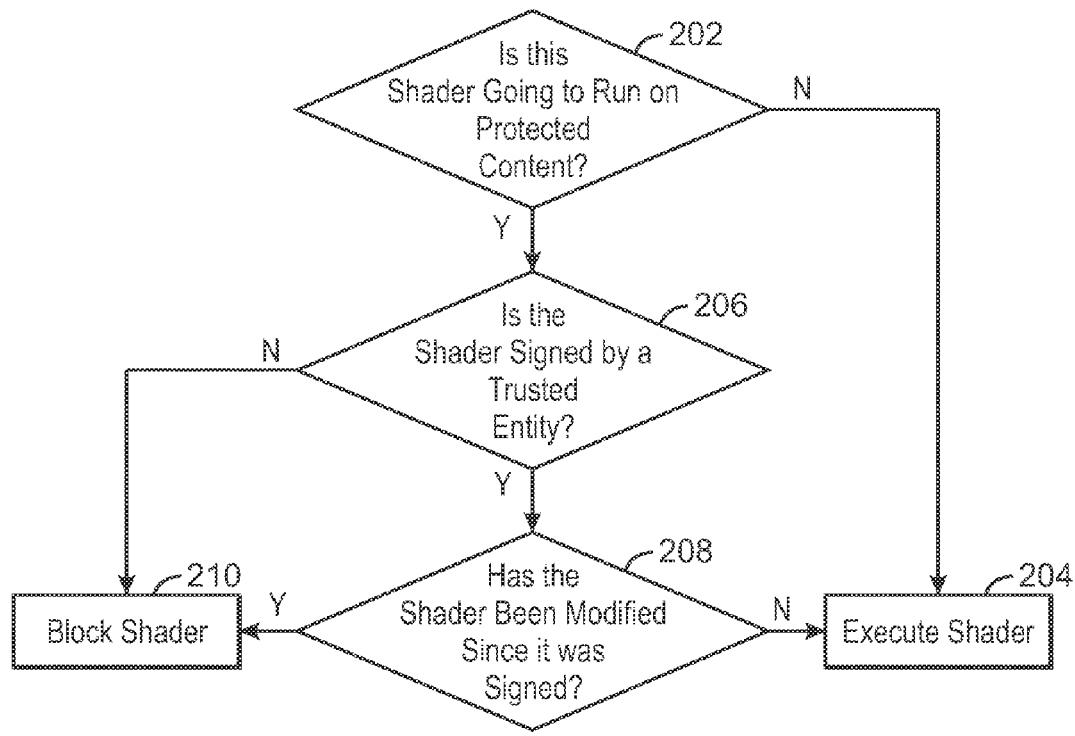
FIG. 2 is a process flow diagram showing a method for securing content from malicious shaders, in accordance with embodiments.

FIG. 2 is a process flow diagram showing a method 200 for securing content from malicious shaders, in accordance with embodiments. In various embodiments, the method 200 may be executed on a computing device, such as the computing device 100.

At block 202, it is determined if the shader will operate on protected content. Protected content is any content to be rendered that contains data which a user would like to be private, such as the sensitive data described above. Additionally, protected content include premium data, such as Blu-Ray playback, described above. Furthermore, the shader may be executed using a specialized processor. For example, the shader may execute using a GPU. In other examples, a set of digital processing algorithms may be executed using an audio and video processor. If the shader will not operate on protected content, process flow continues to block 204. If the shader will operate on protected content, process flow continues to block 206.

At block 204, the shader is executed. At block 206, it is determined if the shader is signed by a trusted entity. As used herein, a trusted entity is an entity that has been included in a list of trusted entities. In embodiments, the list of trusted entities may be provided and updated by original equipment manufacturers (OEMs). The list of trusted entities may be updated and stored on a computing device, such as the computing device 100 (FIG. 1).

The digital signature may be produced using the shader and a key. The key may be generated using various key generation schemes currently known or developed in the future. Accordingly, the key may be produced using one or more of a public key algorithm, private key algorithm, symmetric key algorithm, or any combination thereof. The signature may be verified at the computing device using any signature verification scheme currently known or developed in the future. For example, an entity may sign the shader using a private key. The shader and the private key may be encrypted using a public key known to the computing device. When the shader and the private key are received on the computing device, the shader and private key may be decrypted using the public key known to the computing device. A signature verification scheme may then be used to verify the signature.

If the shader is signed by a trusted entity, process flow continues to block 208. In embodiments, the signature is verified using a signature verification scheme and the entity is verified as a trusted entity. If the shader is not signed by trusted entity, process flow continues to block 210. At block 208, it is determined if the shader has been modified since shader was signed. In embodiments, cryptographic techniques may be used to determine if the shader has been modified since the shader was signed. For example, the computing device may determine that a public or private key used to sign the shader has been modified. If the shader has not been modified since it was signed, process flow continues to block 204, where the shader is executed. If the shader has been modified since it was signed, process flow continues to block 210.

At block 210, the shader is blocked. In other words, the shader is prevented from executing on the protected content. In this manner, any malicious shaders are prevented from executing on protected content. In embodiments, the shader may be quarantined in response to the signature not being verified or the shader may be quarantined in response to being modified.

In embodiments, the shader may execute within a GPU rendering pipeline. By ensuring the shader is signed by a trusted entity and has not been modified subsequent to being signed, the shader is authenticated. Authenticating the shader before it executes within the GPU rendering pipeline prevents an arbitrary, malicious graphics shader from being applied to protected content.

In embodiments, each shader may be assigned a key or other indicator that indicates the shader is not a malicious shader. For example, each shader may be assigned a hash value or a checksum. The shader may be signed using the hash value or the checksum. The key or other indicator of shaders that are known to be good may be stored in tables such as tables 120 (FIG. 1). The key or other indicator enables the key or other indicator of an incoming shader to be compared to the list of good keys or other indicators that may be stored in tables. If the key or other indicator of the incoming shader is found on the list of good keys or other indicators, and the shader has not been modified since it was assigned the key or other indicator, then the shader may execute on the protected content.

In the context of online banking, a malicious shader may alter the images displayed to a user via a web browser. While the user is viewing account information, a malicious shader may cause money to be transferred from the user's account to an unauthorized account, while preventing images related to the transfer from being displayed to the user. However, using the present techniques, the shader will be blocked from execution. Other malicious shaders may access graphics memory in order to obtain sensitive data that was previously displayed to the user. Such malicious shaders will also be recognized using the present techniques and blocked from execution.

In embodiments, the shader may include digital signal processing algorithms, and the protected content may be premium audio. Accordingly, the digital signal processing algorithms may be verified before the digital signal processing algorithms can execute premium audio. Premium audio may include, but is not limited to sensitive phone conversations or telecommunications sent using a computing device, such as a mobile phone or laptop. By verifying the digital signal processing algorithms applied to phone conversations, the corresponding premium audio is secured from unauthorized third parties.

Figure 3:
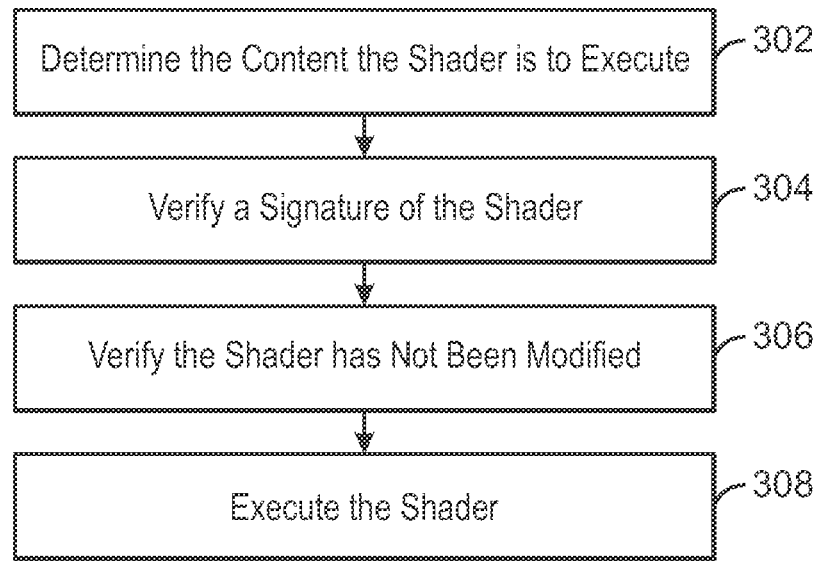
FIG. 3 is another process flow diagram showing a method for securing content from malicious shaders, in accordance with embodiments.

FIG. 3 is another process flow diagram 300 showing a method for securing content from malicious shaders, in accordance with embodiments. At block 302, the content the shader is to execute is determined. Specifically, it may be determined if the shader is to execute on protected content. At block 304, a signature of the shader is verified in response to the shader attempting to execute on protected content. The signature may be verified using a signature verification scheme. In embodiments, the signature is a hash value or a checksum. In embodiments, the signature may be proved to be authentic.

At block 306, in response to the signature of the shader being verified, it is verified that the shader has not been modified subsequent to being signed. In embodiments, it may be confirmed that the shader has had no modifications subsequent to being signed in response to the signature being authenticated. At block 308, the shader is executed in response to not being modified.

The process flow diagrams of FIGS. 2 and 3 are not intended to indicate that the blocks of methods 200 and 300 are to be executed in any particular order, or that all of the blocks are to be included in every case. Further, any number of additional blocks may be included within the methods 200 and 300, depending on the details of the specific implementation.

Figure 4:
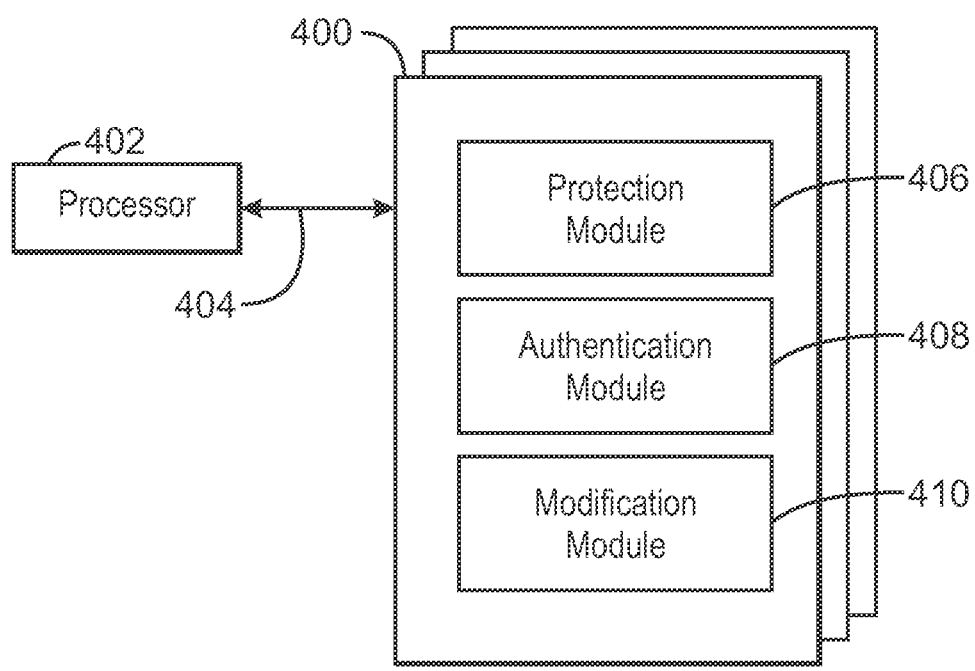
FIG. 4 is a block diagram showing tangible, non-transitory computer-readable media that stores code for securing content from malicious, in accordance with embodiments.

FIG. 4 is a block diagram showing tangible, non-transitory computer-readable media 400 that stores code for securing content from malicious shaders, in accordance with embodiments. The tangible, non-transitory computer-readable media 400 may be accessed by a processor 402 over a computer bus 404. Furthermore, the tangible, non-transitory computer-readable media 400 may include code configured to direct the processor 402 to perform the methods described herein.

The various software components discussed herein may be stored on the tangible, non-transitory computer-readable media 400, as indicated in FIG. 4. A protection module 406 may be configured to determine if the shader will run on protected content. Further, an authentication module 408 may be configured to determine if the shader is signed by a trusted entity. A modification module 410 may determine if the shader has been modified since the shader was signed.

The block diagram of FIG. 4 is not intended to indicate that the tangible, non-transitory computer-readable media 400 is to include all of the components shown in FIG. 4. Further, the tangible, non-transitory computer-readable media 400 may include any number of additional components not shown in FIG. 4, depending on the details of the specific implementation.

Figure 5:
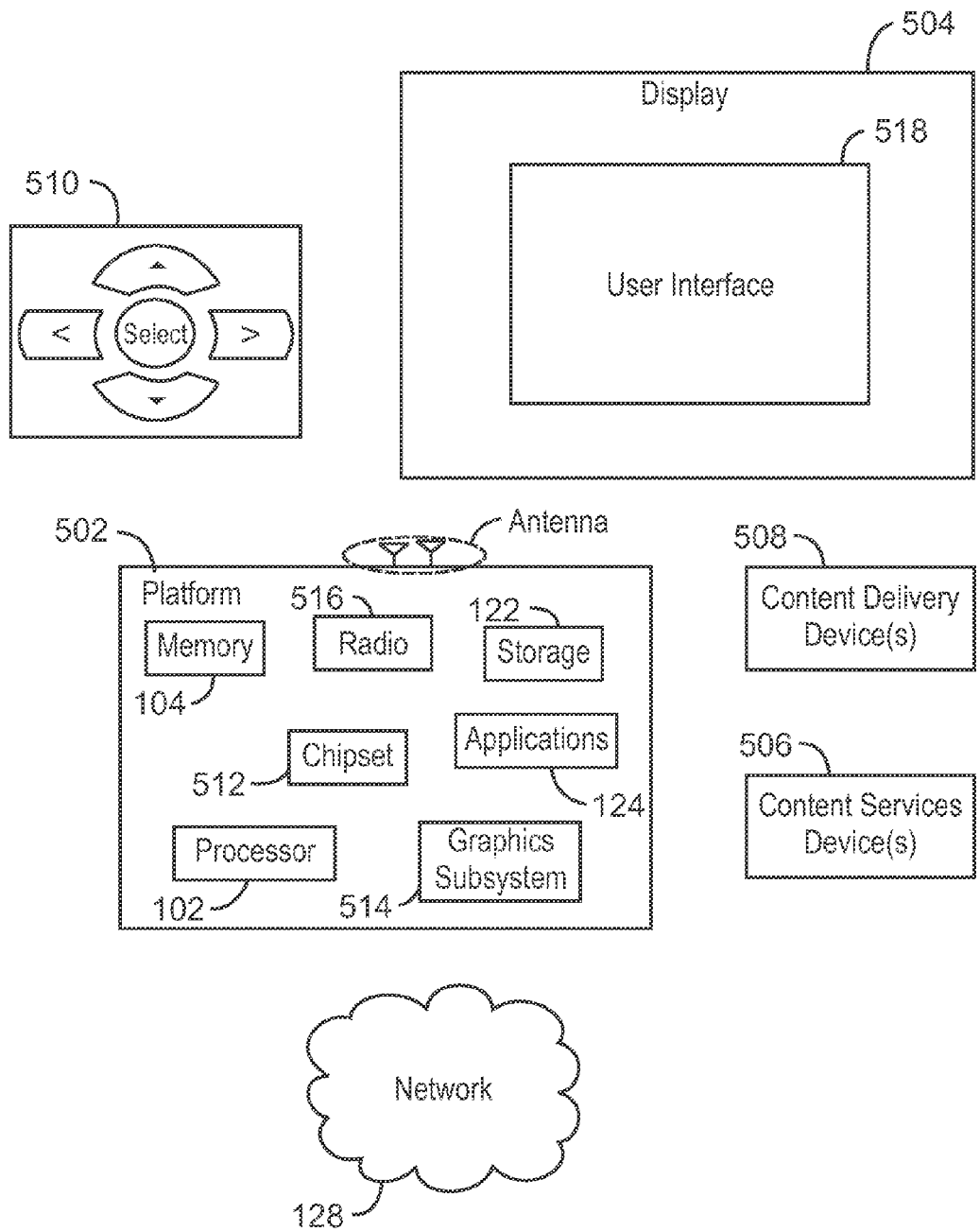
FIG. 5 is a block diagram of an exemplary system for securing content from malicious shaders.

FIG. 5 is a block diagram of an exemplary system 500 for securing content from malicious shaders. Like numbered items are as described with respect to FIG. 1. In some embodiments, the system 500 is a media system. In addition, the system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

In various embodiments, the system 500 comprises a platform 502 coupled to a display 504. The platform 502 may receive content from a content device, such as content services device(s) 506 or content delivery device(s) 508, or other similar content sources. A navigation controller 510 including one or more navigation features may be used to interact with, for example, the platform 502 and/or the display 504. Each of these components is described in more detail below.

The platform 502 may include any combination of a chipset 512, a central processing unit (CPU) 102, a memory device 104, a storage device 122, a graphics subsystem 514, applications 124, and a radio 516. The chipset 512 may provide intercommunication among the CPU 102, the memory device 104, the storage device 122, the graphics subsystem 514, the applications 124, and the radio 516. For example, the chipset 512 may include a storage adapter (not shown) capable of providing intercommunication with the storage device 122.

The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 may be implemented as a volatile memory device such as, but not limited to, a Random Access Memory (RAM), Dynamic Random Access Memory (DRAM), or Static RAM (SRAM). The storage device 122 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 122 includes technology to increase the storage performance enhanced protection for valuable digital media when multiple hard drives are included, for example.

The graphics subsystem 514 may perform processing of images such as still or video for display. The graphics subsystem 514 may include a graphics processing unit (GPU), such as the GPU 106, or a visual processing unit (VPU), for example. An analog or digital interface may be used to communicatively couple the graphics subsystem 514 and the display 504. For example, the interface may be any of a High-Definition Multimedia Interface, DisplayPort, wireless HDMI, and/or wireless HD compliant techniques. The graphics subsystem 514 may be integrated into the processor or the chipset 512. Alternatively, the graphics subsystem 514 may be a stand-alone card communicatively coupled to the chipset 512.

The graphics and/or video processing techniques described herein may be implemented in various hardware architectures. For example, graphics and/or video functionality may be integrated within the chipset 512. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 516 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 516 may operate in accordance with one or more applicable standards in any version.

The display 504 may include any television type monitor or display. For example, the display 504 may include a computer display screen, touch screen display, video monitor, television, or the like. The display 504 may be digital and/or analog. In some embodiments, the display 504 is a holographic display. Also, the display 504 may be a transparent surface that may receive a visual projection. Such projections may convey various forms of information, images, objects, or the like. For example, such projections may be a visual overlay for a mobile augmented reality (MAR) application. Under the control of one or more applications 124, the platform 502 may display a user interface 518 on the display 504.

The content services device(s) 506 may be hosted by any national, international, or independent service and, thus, may be accessible to the platform 502 via the Internet, for example. The content services device(s) 506 may be coupled to the platform 502 and/or to the display 504. The platform 502 and/or the content services device(s) 506 may be coupled to a network 128 to communicate (e.g., send and/or receive) media information to and from the network 128. The content delivery device(s) 508 also may be coupled to the platform 502 and/or to the display 504.

The content services device(s) 506 may include a cable television box, personal computer, network, telephone, or Internet-enabled device capable of delivering digital information. In addition, the content services device(s) 506 may include any other similar devices capable of unidirectionally or bidirectionally communicating content between content providers and the platform 502 or the display 504, via the network 128 or directly. It will be appreciated that the content may be communicated unidirectionally and/or bidirectionally to and from any one of the components in the system 500 and a content provider via the network 128. Examples of content may include any media information including, for example, video, music, medical and gaming information, and so forth.

The content services device(s) 506 may receive content such as cable television programming including media information, digital information, or other content. Examples of content providers may include any cable or satellite television or radio or Internet content providers, among others.

In some embodiments, the platform 502 receives control signals from the navigation controller 510, which includes one or more navigation features. The navigation features of the navigation controller 510 may be used to interact with the user interface 518, for example. The navigation controller 510 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combination thereof. Such physical gestures can be recognized and translated into commands or instructions.

Movements of the navigation features of the navigation controller 510 may be echoed on the display 504 by movements of a pointer, cursor, focus ring, or other visual indicators displayed on the display 504. For example, under the control of the applications 124, the navigation features located on the navigation controller 510 may be mapped to virtual navigation features displayed on the user interface 518. In some embodiments, the navigation controller 510 may not be a separate component but, rather, may be integrated into the platform 502 and/or the display 504.

The system 500 may include drivers (not shown) that include technology to enable users to instantly turn on and off the platform 502 with the touch of a button after initial boot-up, when enabled, for example. Program logic may allow the platform 502 to stream content to media adaptors or other content services device(s) 506 or content delivery device(s) 508 when the platform is turned "off." In addition, the chipset 512 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 500 may be integrated. For example, the platform 502 and the content services device(s) 506 may be integrated; the platform 502 and the content delivery device(s) 508 may be integrated; or the platform 502, the content services device(s) 506, and the content delivery device(s) 508 may be integrated. In some embodiments, the platform 502 and the display 504 are an integrated unit. The display 504 and the content service device (s) 506 may be integrated, or the display 504 and the content delivery device(s) 508 may be integrated, for example.

The system 500 may be implemented as a wireless system or a wired system. When implemented as a wireless system, the system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 502 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 5.

Figure 6:
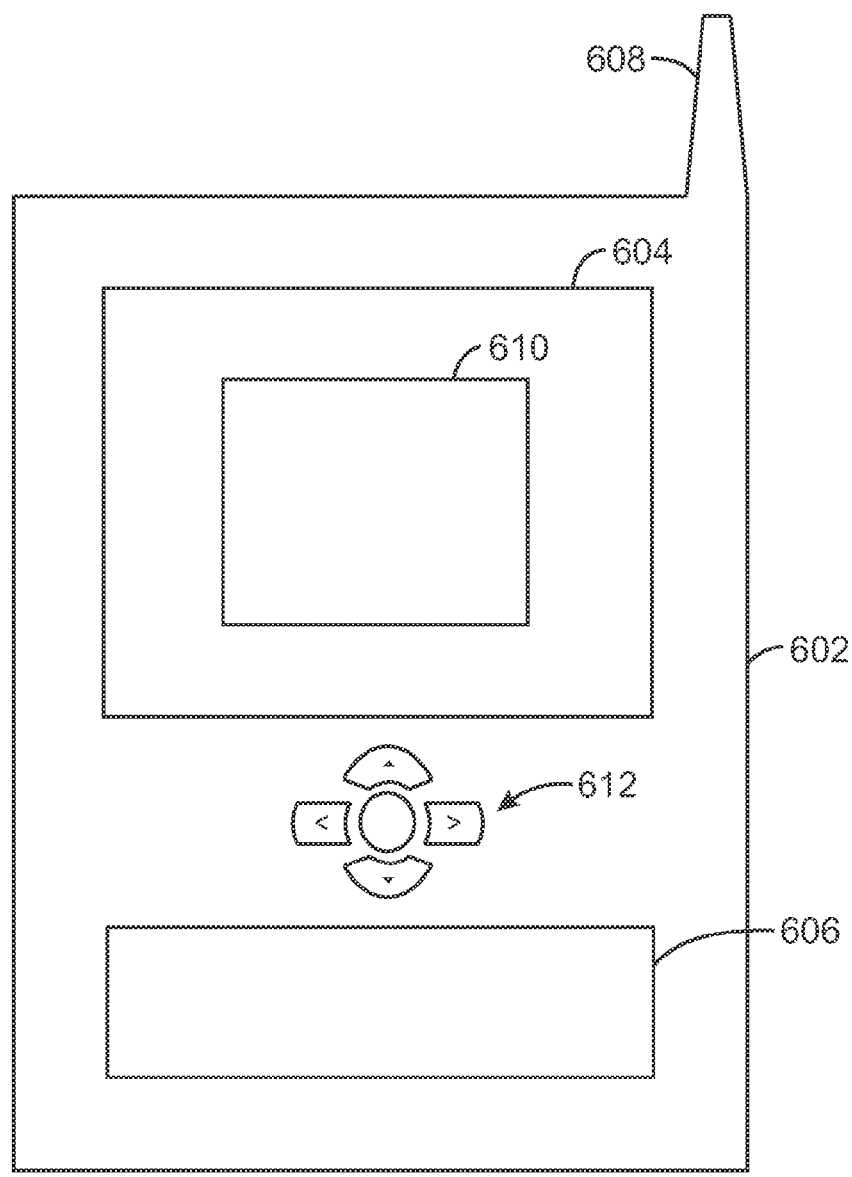
FIG. 6 is a schematic of a small form factor device in which the system of FIG. 5 may be embodied.

FIG. 6 is a schematic of a small form factor device 600 in which the system 500 of FIG. 5 may be embodied. Like numbered items are as described with respect to FIG. 5. In some embodiments, for example, the device 600 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 6, the device 600 may include a housing 602, a display 604, an input/output (I/O) device 606, and an antenna 608. The device 600 may also include navigation features 610. The display 604 may include any suitable display unit for displaying information appropriate for a mobile computing device. The I/O device 606 may include any suitable I/O device for entering information into a mobile computing device. For example, the I/O device 606 may include an alphanumeric keyboard, a numeric keypad, a touch pad, input keys, buttons, switches, rocker switches, microphones, speakers, a voice recognition device and software, or the like. Information may also be entered into the device 600 by way of microphone. Such information may be digitized by a voice recognition device.

EXAMPLE 1

A method for securing content from malicious shaders is described herein. The method includes determining the content the shader is to execute. A signature of the shader is verified in response to the shader attempting to execute on protected content. In response to the shader's signature being verified, it is verified that the shader has not been modified subsequent to being signed. The shader is executed in response to not being modified.

The shader is blocked from execution in response to the signature not being verified. Additionally, the shader is blocked from in response to the signature being modified. Verifying the signature of the shader may include a determination that the shader was signed by a trusted entity. Additionally, the shader may be blocked from execution in response to being modified subsequent to being signed. The shader may be a digital signal processing algorithm, and the protected content may be premium audio and video. The shader may also be quarantined in response to the signature not being verified or the shader may be quarantined in response to being modified subsequent to being signed. Further, the signature of the shader may be verified using one or more of a hash value, a checksum, or any combination thereof.

EXAMPLE 2

A computing device is described herein. The computing device includes a graphics processing unit (GPU) that is configured to execute stored instructions and a storage device that stores instructions. The storage device includes processor executable code that, when executed by the GPU, is configured to determine a content that a shader is to execute. A signature of the shader may be verified in response to the shader's attempt to execute on protected content. In response to the shader being verified, it is verified that the shader has not been modified subsequent to being signed. The shader is executed in response to not being modified.

The GPU is configured to stop the shader from execution in response to the signature not being verified. Additionally, the GPU is configured to stop the shader from execution in response to the signature being modified. The GPU may also be configured to verify the signature of the shader by determining that the shader was signed by a trusted entity. Additionally, the GPU is configured to stop the stop the shader from execution in response to being modified subsequent to being signed. Further, the shader may be a digital signal processing algorithm, and the protected content may be premium audio and video. The GPU is also configured to quarantine the shader in response to the signature not being verified, or quarantine the shader in response to being modified subsequent to being signed. Further, the GPU may be configured to verify the signature of the shader using one or more of a hash value, a checksum, or any combination thereof. The computing device may include a radio and a display, and the radio and the display may be communicatively coupled at least to a central processing unit.

EXAMPLE 3

At least one non-transitory machine readable medium having instructions stored therein is described herein. In response to being executed on a computing device, the instructions cause the computing device to determine the content the shader is to execute. A signature of the shader is authenticated in response to the shader attempting to execute on protected content. In response to the shader's signature being authenticated, it is confirmed that the shader has not been modified subsequent to being signed. The shader is executed in response to not being modified.

The shader is prevented from execution in response to the signature not being authenticated. Additionally, the shader is prevented from executing in response to the shader being modified. Authenticating the signature of the shader may include a determination that the shader was signed by a trusted entity. Additionally, the shader may be prevented from executing in response to being modified subsequent to being signed. Further, the shader may be a digital signal processing algorithm, and the protected content may be premium audio and video.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method for securing content from malicious shaders, comprising:
    assigning a key to a shader;
    determining the content the shader is to execute;
    verifying a signature of the shader was signed by a trusted entity in response to the shader attempting to execute on protected content, wherein the signature is produced using the shader and the key;
    verifying the shader has not been modified subsequent to being signed in response to the signature being verified as signed by a trusted entity using cryptographic techniques;
    comparing the key to a list of good keys in response to the shader not being modified;
    storing the key assigned to the shader in the list of good keys in response to the key not being found on the list of good keys, wherein the key indicates that the shader is not a malicious shader and has not been modified; and
    executing the shader in response to the shader not being modified, and blocking the shader from execution in response to the shader being modified.

2. The method of claim 1, further comprising blocking the shader from execution in response to the signature not being verified.

3. The method of claim 1, further comprising blocking the shader from execution in response to being modified subsequent to being signed.

4. The method of claim 1, wherein the shader is a digital signal processing algorithm, and the protected content is premium audio and video.

5. The method of claim 1, further comprising quarantining the shader in response to the signature not being verified or quarantining the shader in response to the shader being modified subsequent to being signed.

6. The method of claim 1, further comprising verifying the signature of the shader using one or more of a hash value, a checksum, or any combination thereof.

7. A computing device, comprising:
    a graphics processing unit (GPU) that is configured to execute stored instructions and a storage device that stores instructions, wherein the storage device includes processor executable code that, when executed by the GPU, is configured to:
    assigning a key to a shader;
    determine a content that a shader is to execute;

verify a signature of the shader was signed by a trusted entity in response to the shader's attempt to execute on protected content, wherein the signature is produced using the shader and the key;

verify the shader has had no modifications subsequent to being signed in response to the signature being verified as signed by a trusted entity using cryptographic techniques;

comparing the key to a list of good keys in response to the shader not being modified;

store the key assigned to the shader in the list of good keys in response to the key not being found on the list of good keys, wherein the key indicates that the shader is not a malicious shader and has not been modified; and execute the shader in response to the shader's lack of modifications, and blocking the shader from execution in response to the shader being modified.

8. The computing device of claim 7, wherein the GPU is configured to stop the shader from execution in response to the signature not being verified.

9. The computing device of claim 7, wherein the GPU is configured to stop the shader from execution in response to being modified subsequent to being signed.

10. The computing device of claim 7, wherein the shader is a digital signal processing algorithm, and the protected content is premium audio and video.

11. The computing device of claim 7, wherein the GPU is configured to quarantine the shader in response to the signature not being verified, or quarantine the shader in response to being modified subsequent to being signed.

12. The computing device of claim 7, wherein the GPU is configured to verify the signature of the shader using one or more of a hash value, a checksum, or any combination thereof.

13. The computing device of claim 7, further comprising a radio and a display, the radio and display communicatively coupled at least to a central processing unit of the computing device.

14. At least one non-transitory machine readable medium having instructions stored therein that, in response to being executed on a computing device, cause the computing device to:

assigning a key to a shader;

determine a content that a shader is to execute;

authenticate a signature of the shader was signed by a trusted entity in response to the shader attempting to execute on protected content, wherein the signature is produced using the shader and the key;

confirm the shader has had no modifications subsequent to being signed in response to the signature being authenticated as signed by a trusted entity using cryptographic techniques;

store the key assigned to the shader in the list of good keys in response to the key not being found on the list of good keys, wherein the key indicates that the shader is not a malicious shader and has not been modified; and execute the shader in response to the shader's lack of modifications, and blocking the shader from execution in response to the shader being modified.

15. The at least one non-transitory machine readable medium of claim 14, further comprising preventing the shader from execution in response to the signature not being authenticated.

16. The at least one non-transitory machine readable medium of claim 14, further comprising preventing the shader from executing in response to being modified subsequent to being signed.

17. The at least one non-transitory machine readable medium of claim 14, wherein the shader is a digital signal processing algorithm, and the protected content is premium audio and video.

* * * * *